United States Patent
Burton

(10) Patent No.: US 12,455,699 B2
(45) Date of Patent: *Oct. 28, 2025

(54) DATA STORAGE DEVICE WITH VARIABLE CONTAINERS FOR LOGIC BLOCKS

(71) Applicant: WESTERN DIGITAL TECHNOLOGIES, INC., San Jose, CA (US)

(72) Inventor: Scott Burton, Westminster, CO (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/590,214

(22) Filed: Feb. 28, 2024

(65) Prior Publication Data

US 2024/0201883 A1    Jun. 20, 2024

Related U.S. Application Data

(63) Continuation of application No. 17/841,460, filed on Jun. 15, 2022, now Pat. No. 11,941,274.

(51) Int. Cl.
G06F 3/06    (2006.01)
(52) U.S. Cl.
CPC ............ G06F 3/064 (2013.01); G06F 3/0608 (2013.01); G06F 3/0676 (2013.01)
(58) Field of Classification Search
None
See application file for complete search history.

(56) References Cited

U.S. PATENT DOCUMENTS

| 5,241,531 A | 8/1993 | Ohno et al. |
| 5,583,842 A | 12/1996 | Wilson et al. |
| 5,818,654 A | 10/1998 | Reddy et al. |

(Continued)

FOREIGN PATENT DOCUMENTS

| EP | 0429435 | 5/1991 |
| KR | 100464440 | 6/2004 |

OTHER PUBLICATIONS

BlockDevices—https://www.cs.yale.edu/homes/aspnes/pinewiki/BlockDevices.html; Jun. 17, 2014; 4 pages.

(Continued)

*Primary Examiner* — Baboucarr Faal
(74) *Attorney, Agent, or Firm* — Calderon Safran & Wright P.C.

(57) ABSTRACT

Various illustrative aspects are directed to a data storage device, comprising: one or more disks; a write mechanism configured to write data to disk surfaces of the one or more disks; and one or more processing devices, which are configured to: encode, based on a distributed sector encoding scheme, data into a plurality of logic blocks of data, wherein the logic blocks of data comprise the data to be written being interleaved across a plurality of sectors; assign at least some of the logic blocks to a plurality of containers of two or more container sizes, the container sizes comprising a relatively larger container size and a relatively smaller container size; and output a write signal to the write mechanism to write the logic blocks in accordance with the assigning of the at least some of the logic blocks to the plurality of containers.

19 Claims, 7 Drawing Sheets

(56) References Cited

U.S. PATENT DOCUMENTS

| | | |
|---|---|---|
| 5,844,911 A | 12/1998 | Schadegg et al. |
| 5,848,438 A | 12/1998 | Nemazie et al. |
| 5,937,435 A | 8/1999 | Dobbek et al. |
| 6,101,619 A | 8/2000 | Shin |
| 6,295,176 B1 | 9/2001 | Reddy et al. |
| 6,341,109 B1 | 1/2002 | Kayanuma |
| 6,654,904 B1 | 11/2003 | Andoh et al. |
| 7,245,445 B2 | 7/2007 | Seok |
| 8,959,281 B1 | 2/2015 | Malina et al. |
| 9,059,737 B2 | 6/2015 | Coker et al. |
| 9,063,838 B1 | 6/2015 | Boyle et al. |
| 9,368,152 B1 | 6/2016 | Mooncholpark |
| 9,632,863 B2 | 4/2017 | Galbraith et al. |
| 10,261,707 B1 | 4/2019 | Chaichanavong et al. |
| 10,910,012 B1 | 2/2021 | Kobayashi et al. |
| 10,998,001 B1 | 5/2021 | Varnica et al. |
| 11,061,582 B2 | 7/2021 | Oberg |
| 2001/0042223 A1 | 11/2001 | Hoskins |
| 2003/0223328 A1 | 12/2003 | Nadershashi et al. |
| 2004/0100715 A1 | 5/2004 | Smith et al. |
| 2007/0074087 A1 | 3/2007 | Lo |
| 2008/0244356 A1 | 10/2008 | Bliss et al. |
| 2013/0038961 A1 | 2/2013 | Song |
| 2014/0379965 A1 | 12/2014 | Gole et al. |
| 2016/0012850 A1 | 1/2016 | Feldman |
| 2020/0272339 A1* | 8/2020 | Oberg ................ G11B 20/1809 |
| 2022/0076695 A1 | 3/2022 | Shibasaki |
| 2023/0409216 A1 | 12/2023 | Burton |

OTHER PUBLICATIONS

[PATCHv5 00/14] dm-zoned: metadata version 2 https://www.spinics.net/lists/dm-devel/msg40779.html; May 11, 2020; 5 pages.

Xie et al. "Zone Tier: A Zone-based Storage Tiering and Caching Co-Design to Integrate SSDs with Host-Aware SMR Drives"; https://sc17.supercomputing.org/SC 17%20Archive/tech_poster/poster_files/post204s2-file3.pdf; Jul. 10, 2019; 1 page.

Lenny Sharp, "Making Host Managed SMR Work for You—Dropbox's Successful Journey"; https://blog.westerndigital.com/host-managed-smr-dropbox/; Jun. 12, 2018; 10 pages.

Shingled Magnetic Recording + HelioSeal® Technology; https:1/media.bitpipe.com/io_15x/io_152122/item_2244017/White-paper-shingled-magnetic-recording-helioseal-technology-_pdf; Jun. 2018; 5 pages.

Alexander Thomasian, "Survey and Analysis of Disk Scheduling Methods", ACM SIGARCH Computer Architecture News, vol. 39, No. 2, May 2011, pp. 8-25. https://sci-hub.se/https://doi.org/10.1145/2024716.2024719.

Notice of Allowance dated Feb. 16, 2024 in related U.S. Appl. No. 17/850,945, 6 pages.

* cited by examiner

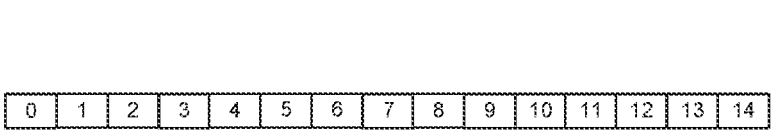
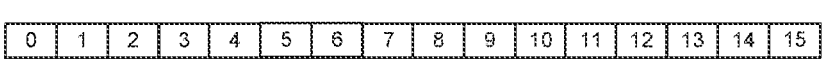
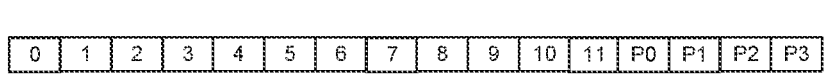
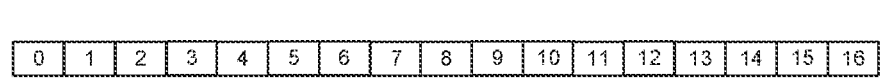
FIG. 5

DATA STORAGE DEVICE WITH VARIABLE CONTAINERS FOR LOGIC BLOCKS

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 4. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as one or more fine actuators, in a dual stage actuator or a triple stage actuator, in some examples.

Disk drive control circuitry may use various means to encode data to be written onto disk surfaces. Disk drive control circuitry may, for example, encode data together with error correction code (ECC) bits in code in the form of codewords, such as low-density parity-check (LDPC) codewords. Disk drive control circuitry may interleave encoded data, to be written in an interleaved pattern onto disk surfaces. Disk drive control circuitry may encode blocks of data spanning multiple sectors into codewords in a distributed sector encoding scheme, and perform and implement further advantageous techniques, such as are disclosed in U.S. Pat. No. 9,059,737 issued to Coker et al. and assigned to the same assignee in common as the present disclosure, and which is incorporated in its entirety by reference herein.

SUMMARY

Various examples disclosed herein provide data storage devices such as hard disk drives with control circuitry that defines a container constitution, assigns data to logic blocks, distributed sectors, variable containers, container spans, and container span sets, and assigns the layout and placement of the same, as further described below, in accordance with aspects of the present disclosure. The variable containers may include containers of at least two different sizes, in terms of numbers of logic blocks, in a variable container assignment scheme, which may facilitate assigning logic blocks to integer numbers of containers in a track while using the entire capacity of the track, in various examples, among other advantages. Mapping logic blocks of data into relatively large distributed sectors spread across disk surfaces may provide certain advantages, such as averaging variations in track misregistration (TMR) and signal-to-noise ratio (SNR), diluting the impact of defects in the disk surface across logic blocks, and achieving more closely spaced operable data tracks to achieve higher data density of data tracks per width, such as may be measured in tracks per inch (TPI), even with the same number of logic blocks and relative to data density as measured in blocks per inch (BPI). Using relatively larger distributed sectors may maximize these advantages of relatively larger distributed sector size, and spread a larger number of distributed sectors across a larger number of logic blocks and a larger number of data tracks, at least up to a point of diminishing incremental returns and countervailing criteria in terms of distributed sector size, in accordance with novel and advantageous insights of this disclosure.

Distributed sectors may be limited in size by the size of a memory buffer of the control circuitry. The control circuitry may encode, based on a distributed sector encoding scheme, data into a plurality of logic blocks of data. The logic blocks of data comprise the data to be written being interleaved across a plurality of sectors. The control circuitry may then write the data in the logic blocks to one media block on a disk surface at a time, and each media block on a disk surface may comprise interleaved data from some or all of the logic blocks comprised in an applicable distributed sector, in accordance with the distributed sector encoding scheme. The control circuitry may also encode data into containers of different sizes, where each container may either be one-to-one identical with a distributed sector, or may include more than one distributed sector, and may be of two or more sizes. The control circuitry may specify a container constitution, which may define all of the criteria and policies for how to assign data logic blocks into containers of different sizes, in various examples of this disclosure.

Distributed sectors may store a large block of data interleaved across multiple media sectors. Distributed sectors may be implemented having a wide range and distribution of other sizes, in other implementations. Variable containers and distributed sectors of variable or fixed sizes may enable mapping all logic blocks and sectors onto a track or set of tracks, in accordance with various examples. Variable containers may enable efficient, logical, and effective techniques for balancing advantages of relatively larger and smaller sizes of containers, fitting integer numbers of containers of different sizes into available spaces such as tracks or sets of tracks, and organizing, weighting, and justifying containers of different sizes and different payloads, such as those that comprise parity data, in various examples.

Various illustrative aspects are directed to a data storage device, comprising: one or more disks; a write mechanism configured to write data to disk surfaces of the one or more disks; and one or more processing devices. The one or more processing devices are configured to: encode, based on a distributed sector encoding scheme, data into a plurality of logic blocks of data, wherein the logic blocks of data comprise the data to be written being interleaved across a plurality of sectors; assign at least some of the logic blocks of data to a plurality of containers of two or more container sizes, the container sizes comprising a relatively larger container size and a relatively smaller container size; and output a write signal to the write mechanism to write the logic blocks of data in accordance with the assigning of the at least some of the logic blocks to the plurality of containers.

Various illustrative aspects are directed to a method. The method comprises encoding, by one or more processing devices, based on a distributed sector encoding scheme, data into a plurality of logic blocks of data, wherein the logic blocks of data comprise the data to be written being interleaved across a plurality of sectors; assigning, by one or more processing devices, at least some of the logic blocks of data to a plurality of containers of two or more container sizes, the container sizes comprising a relatively larger container size and a relatively smaller container size; and outputting, by the one or more processing devices, a write signal to a write mechanism configured to write data to disk surfaces of one or more disks of a data storage device, to write the at least some of the logic blocks of data in accordance with the assigning of the at least some of the logic blocks of data to the plurality of containers.

Various illustrative aspects are directed to one or more processing devices. The one or more processing devices comprise means for encoding, based on a distributed sector encoding scheme, data into a plurality of logic blocks of data, wherein the logic blocks of data comprise the data to be written being interleaved across a plurality of sectors; means for assigning at least some of the logic blocks of data to a plurality of containers of two or more container sizes, the container sizes comprising a relatively larger container size and a relatively smaller container size; and means for outputting a write signal to a write mechanism configured to write data to disk surfaces of one or more disks of a data storage device, to write the at least some of the logic blocks of data in accordance with the assigning of the at least some of the logic blocks of data to the plurality of containers.

Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

FIG. 5 shows five different containers of three different container sizes, each container having a different payload, each with a size and/or mix of data types between user data and parity data, unique from the payload of any of the others, in accordance with various examples.

DETAILED DESCRIPTION

Figure 1:
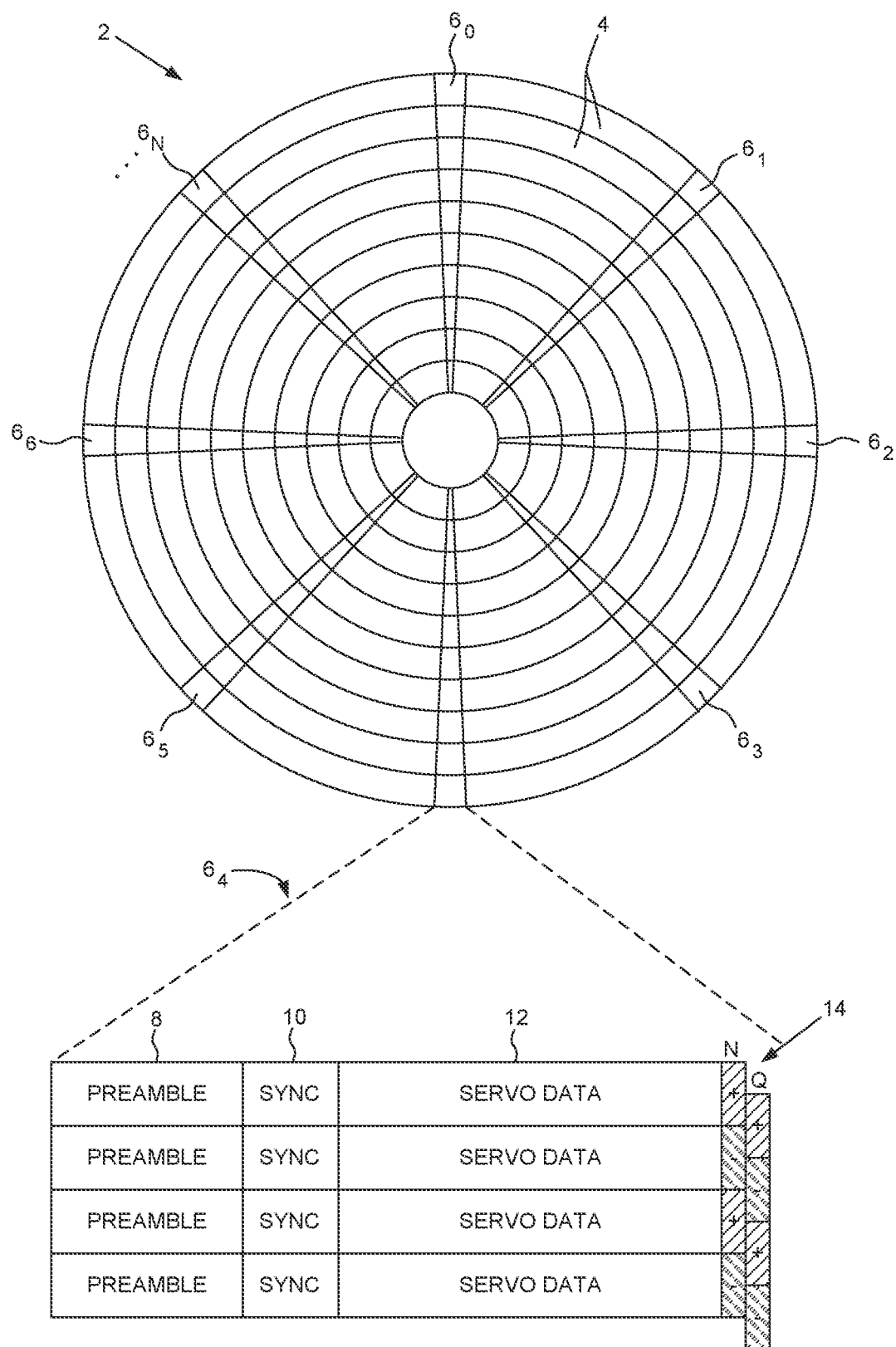
FIG. 1 shows a prior art disk format as comprising a number of radially-spaced, concentric servo tracks defined by servo wedges recorded around the circumference of each servo track.
Figure 2:
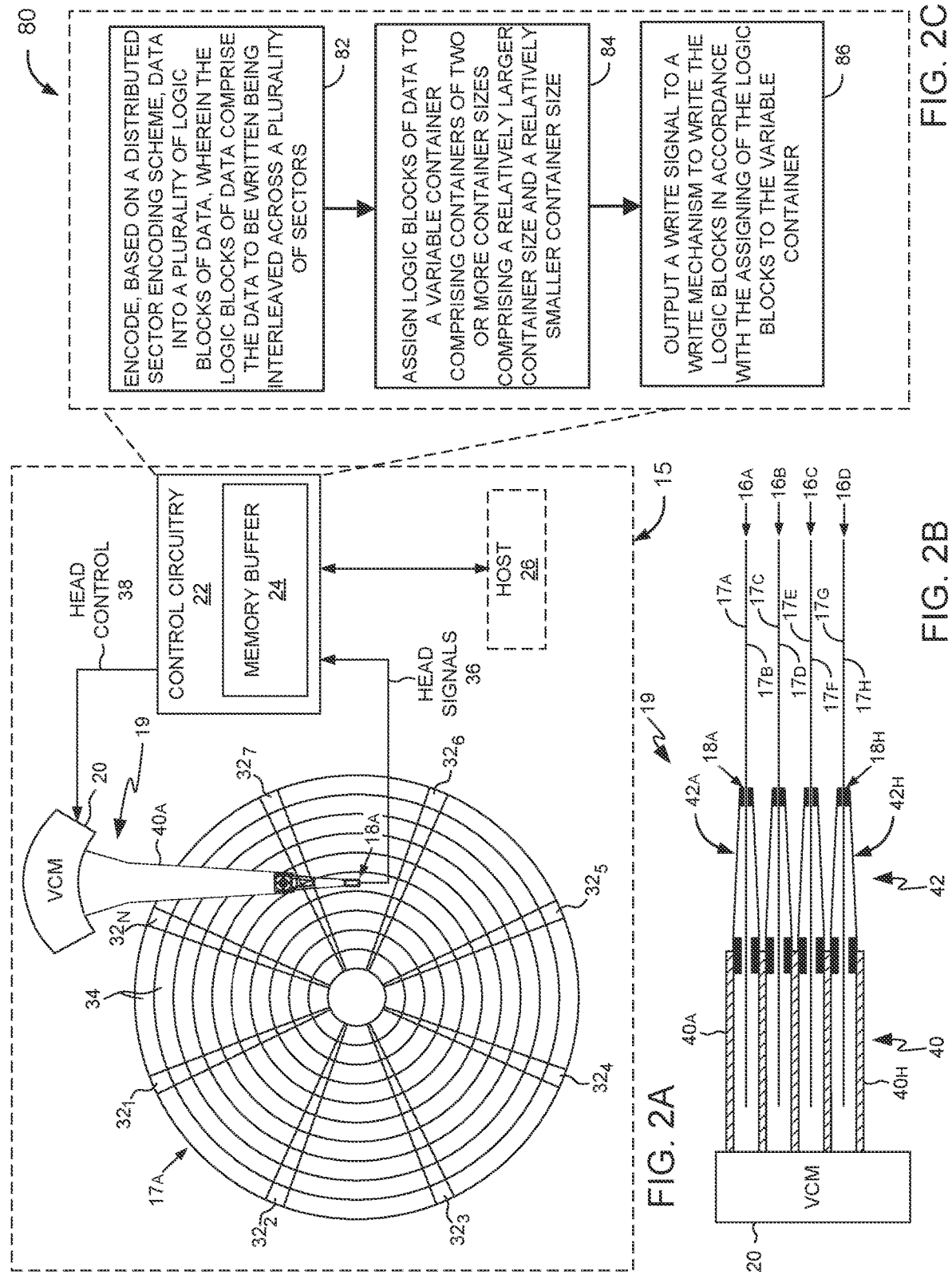
FIGS. 2A and 2B illustrate conceptual block diagrams of a top view and a side view of a data storage device in the form of a disk drive, in accordance with aspects of the present disclosure.
FIG. 2C depicts a flowchart for an example method that control circuitry of a disk drive may perform or execute in controlling the operations of the disk drive, including operations involved in assigning data to variable containers in accordance with aspects of the present disclosure.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator arm assembly 19, and a plurality of hard disks 16A, 16B, 16C, 16D ("hard disks 16"). FIG. 2C depicts a flowchart for an example method 80 that control circuitry 22 of disk drive 15 may perform or execute in controlling the operations of disk drive 15, including operations involved in assigning data to variable containers in accordance with aspects of the present disclosure, which may include defining a container constitution, and assigning data to logic blocks, distributed sectors, variable containers, container spans, and container span sets, and assigning the layout and placement of the same, as further described below, in accordance with aspects of the present disclosure.

Actuator arm assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a suspension assembly 42 at a distal end thereof (e.g., example topmost suspension assembly 42A comprised in topmost actuator arm 40A, in the view of FIGS. 2A and 2B). Each suspension assembly 42 may comprise one or more additional fine actuators, in some examples.

Each of actuator arms 40 is configured to suspend one of read/write heads 18 ("heads 18") in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Other examples may include any of a wide variety of other numbers of hard disks and disk surfaces, and other numbers of actuator arm assemblies, primary actuators, and fine actuators besides the one actuator arm assembly 19 and the one primary actuator 20 in the example of FIGS. 2A and 2B, for example.

In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples.

Control circuitry 22 may comprise one or more processing devices that constitute device drivers, specially configured for driving and operating certain devices. Control circuitry 22 may comprise one or more processing devices configured for defining a container constitution, and assigning data to logic blocks, distributed sectors, variable containers, container spans, and container span sets, and assigning the layout and placement of the same, as further described below, in accordance with various examples. Control circuitry 22 may comprise and/or be configured with integrated components of one or more larger-scale circuits, such as one or more power large-scale integrated circuit (PLSI) chips or circuits, in various examples. Control circuitry 22 may comprise and/or be configured with components in other large-scale integrated circuits such as system on chip (SoC) circuits, or as more or less stand-alone circuits, which may be operably coupled to other components of control circuitry 22, in various examples.

Primary actuator 20 may perform primary, macroscopic actuation of a plurality of actuator arms 40, each of which may suspend one of heads 18 over and proximate to corresponding disk surfaces 17 of disks 16. The positions of the heads, e.g., heads 18A and 18H, are indicated in FIG. 2A, although the heads are generally positioned very close to the disk surfaces, and are too small to be visible if depicted to scale in FIGS. 2A and 2B.

Example disk drive 15 of FIGS. 2A and 2B comprises four hard disks 16. Other examples may comprise any number of disks, such as just one disk, two disks, three disks, or five or more disks. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. Actuator assembly 19 suspends heads 18 of each actuator arm 40 over and proximate to a corresponding disk surface 17, enabling each of heads 18 to write control features and data to, and read control features and data from, its respective, proximate disk surface 17. In this sense, each head 18 of each actuator arm 40 interacts with a corresponding disk surface 17.

Actuator arm assembly 19, including heads 18, may thus form a write mechanism that is configured to write data to disk surfaces 17 of disks 16. Other examples may include other variations or types of one or more actuator arm assemblies or other mechanisms that may constitute a write mechanism configured to write data to disk surfaces of one or more disks, in various examples. Control circuitry 22 may designate a container constitution and may designate, map, and/or assign logic blocks to variable containers, and/or designate, map, and/or assign variable containers to media sectors, tracks, and/or sets of tracks of disk surfaces 17, by way of any intermediating means or manner of write mechanism, with any of a variety of details of structure and function, in various examples.

The term "disk surface" may be understood to have the ordinary meaning it has to persons skilled in the applicable engineering fields of art. The term "disk surface" may be understood to comprise both the very outer surface layer of a disk drive as well as a volume of disk drive matter beneath the outer surface layer, which may be considered in terms of atomic depth, or (in a greatly simplified model) the number of atoms deep from the surface layer of atoms in which the matter is susceptible of physically interacting with the heads. The term "disk surface" may comprise the portion of matter of the disk that is susceptible of interacting with a read/write head in disk drive operations, such as control write operations, control read operations, data write operations, and data read operations, for example.

In the embodiment of FIGS. 2A and 2B, each disk surface, e.g., disk surface 17A as shown in FIG. 2A, comprises a plurality of control features. The control features comprise servo wedges $32_1$-$32_N$, which define a plurality of servo tracks 34, wherein data tracks are defined relative to the servo tracks 34, and which may be at the same or different radial density. Control circuitry 22 processes a read signal 36 emanating from the respective head, e.g., head 18A, to read from disk surface 17A, to demodulate the servo wedges $32_1$-$32_N$ and generate a position error signal (PES) representing an error between the actual position of the head and a target position relative to a target track. A servo control system in the control circuitry 22 filters the PES from the servo wedges using a suitable compensation filter to generate a control signal 38 applied to actuator arm assembly 19, including to control actuator 20, which functions as a primary actuator, and which rotates actuator arm assembly 19 about an axial pivot in order to perform primary actuation of the corresponding heads radially over the disk surfaces 17 in a direction that reduces the PES, as well as to control any fine actuators, in various examples.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. Other examples may employ more than two actuator arm assemblies or primary actuators or multi-actuators, which may be actuated about a common pivot, or which may be comprised in multiple multi-actuators mounted at different circumferential locations about the disks.

In executing example method 80 of FIG. 2C (aspects of which will also be further explained below with reference to the further figures), control circuitry 22 may issue one or more commands to other components of disk drive 15, receive information from one or more other components of disk drive 15, and/or perform one or more internal operations, such as generating one or more driver currents for outputting to system components of disk drive 15, such as head driver control signals to implement writes in accordance with designated and/or assigned containers in accordance with this disclosure. In particular, control circuitry 22 may encode, based on a distributed sector encoding scheme, data into a plurality of logic blocks of data, wherein the logic blocks of data comprise the data to be written being interleaved across a plurality of sectors (82). Control circuitry 22 may further assign at least some of the logic blocks of data to containers of two or more container sizes in a variable container assignment scheme, the container sizes comprising a relatively larger container size and a relatively smaller container size (84). Control circuitry 22 may further output a write signal to the write mechanism to write the at least some of the logic blocks in accordance with the assigning of the at least some of the logic blocks to the containers of two or more container sizes in the variable container assignment scheme (86).

Control circuitry 22 may organize and/or encode data (e.g., in the form of low-density parity-check (LDPC) codewords, or into any other applicable encoding) into logic blocks of a selected size (measured in terms of amounts of data), for example, 4 kilobytes (kB) of data per logic block, or any other amount of data per logic block in other examples. Control circuitry 22 may map and interleave the logic blocks in an interleaving pattern of one or more logic blocks per each distributed sector across the media blocks. In one example, control circuitry 22 may assign, map, and interleave eight logic blocks of 4 KB of data each in an interleaved pattern per each distributed sector across the media blocks, thereby generating distributed sectors of 32 KB of data each. In some examples, control circuitry 22 may implement up to a maximum of 16 interleaves per each media sector, and may implement a distributed sector of size larger than 16, such as 17, such that the first media sector has interleaves from only the first 16 logical blocks. In other examples, control circuitry 22 may assign, map, and interleave any other numbers of logic blocks of any size into each distributed sector, and with interleaves from any other number of source logical blocks.

Control circuitry 22 may map each distributed sector to correspondingly sized, physical dispersed, distributed areas of one or more disk surface media blocks on one or more disk surfaces 17 of disk drive 15. The media blocks may be spread across write gates of disk surfaces 17, which may be or include the writeable areas of disk surfaces 17 that aren't occupied by control patterns such as servo patterns. Mapping the logic blocks of data into relatively large distributed sectors spread across disk surfaces 17 may provide certain advantages, such as averaging variations in track misregistration (TMR) and signal-to-noise ratio (SNR), diluting the impact of defects in the disk surface across logic blocks, and achieving more closely spaced operable data tracks to achieve higher data density of data tracks per width, such as may be measured in tracks per inch (TPI), even with the same number of logic blocks and relative to data density as measured in blocks per inch (BPI). Interleaving doesn't change how disk drive 15 writes data, but it changes the payloads of write operations. To read each interleaved logic block requires reading across all the corresponding media blocks across which the logic block is written. Interleaving logic blocks may spread the sections of a media defect on disk surface 17, such as a scratch, or any other mechanical or chemical infringement or effect on disk surface 17 that prevents or inhibits normal writes to and reads from that infringed section of disk surface 17, across logic blocks. Spreading the defect across logic blocks may not increase storage ability by number of media blocks, but does enable writing tracks closer together, thereby increasing tracks per inch (TPI), and reducing the radial distance for head 18 to cover in a seek operation between tracks, even with the same number of logic blocks and relative to data density as measured in blocks per inch (BPI).

Using relatively larger distributed sectors may maximize these advantages of relatively larger distributed sector size, and spread a larger number of distributed sectors across a larger number of logic blocks and a larger number of data tracks, at least up to a point of diminishing incremental returns and countervailing criteria in terms of distributed sector size, in accordance with novel and advantageous insights of this disclosure.

Distributed sectors may be limited in size by the size of a memory buffer 24 of control circuitry 22. Control circuitry 22 may load the entirety of data to encode in one distributed sector into memory buffer 24 before writing that distributed sector to one or more disk surfaces 17. Control circuitry may write data to one media block on a disk surface 17 at a time, and each media block on a disk surface 17 may comprise interleaved data from some or all of the logic blocks comprised in the applicable distributed sector. Disk drive 15 of this disclosure may comprise a substantially large memory buffer 24, relative for example to traditional memory buffer sizes in the industry as understood by persons skilled in the applicable field of art, in some examples, which may help enable use of and encoding data into substantially large distributed sectors. In one illustrative example, control circuitry 22 may encode distributed sectors and containers of seven and eight logic blocks of 4 KB each, in a variable container assignment scheme. In another illustrative example, control circuitry 22 may encode distributed sectors and containers in a variable container assignment scheme such that each of the containers have either 15, 16, or 17 logic blocks.

Control circuitry 22 may thus encode data into containers of different sizes in a variable container assignment scheme, where each container may either be one-to-one identical with a distributed sector, or may include more than one distributed sector, and may be of two or more sizes; and each variable container may include multiple containers, in various examples of this disclosure. The size of the container may be defined as the number of logic blocks, and/or the number of sectors, used by the container to store its data. Control circuitry 22 may specify a container constitution, which may define all of the criteria and policies for how to assign data logic blocks into containers and variable containers, in various examples of this disclosure.

Distributed sectors may store a large block of data interleaved across multiple media sectors. Distributed sectors may be implemented having sizes of either 17, 16, and 15 logic blocks, which may each be logic blocks of 4 KB of data, in one example. Distributed sectors may be implemented having sizes of 8 and 7 logic blocks, in another example. Distributed sectors may be implemented having a wide range and distribution of other sizes, in other implementations. It may be advantageous to keep containers of variable sizes still having relatively similar sizes to each other, in various examples. Variable containers and distributed sectors of variable or fixed sizes may enable mapping all logic blocks and sectors onto a track or set of tracks, in accordance with various examples. For example, a container constitution scheme of this disclosure that enables three container sizes of either 15, 16, or 17 logic blocks is able to assign a set of containers to each track that covers the entirety of the track, with an integer number of containers, for any track of 120 or more logic blocks (in a configuration in which containers have a one-to-one correspondence with distributed sectors). A constitution with 8 containers selected from among these three sizes can cover any size of track from 120 to 136 logic blocks, from a low end of 8 containers of 15 blocks covering 120 blocks to a high end of 8 containers of 17 blocks covering 136 blocks. The high end of the range with 8 containers thus overlaps the low end of the range with 9 containers, at 135 blocks, with 9 containers of 15 blocks each; the high end of that range is 153 blocks, covered by 9 containers of size 17 each, which has a large overlap with the low end of the range with 10 containers, at 150 blocks, covered by 10 containers of size 15 blocks each; and so on, the ranges of each number of containers continue to have larger ranges of overlap for all progressively larger possible sizes of track to have all their logic blocks completely covered by integer numbers of containers selected from among these three sizes.

Control circuitry 22 may assign and map a set of logic blocks to a corresponding set of media sectors, in a one-to-one correspondence between number of logic blocks and number of media sectors to which that collection of logic blocks is written, in an interleaved manner, in various examples. The media sectors may correspond to sectors of a track or of one or more tracks written to the media surface or disk surface 17, with corresponding numbers of sectors per track (SPT), which may refer to a number of media sectors per one track or per one set of tracks, in various examples. Control circuitry 22 may thus assign logic blocks, in a number of logic blocks that may have a one-to-one correspondence to a number of corresponding media sectors, to be written to a given track or set of tracks with a given number of sectors per track, such that the number of sectors per track may also correspond to a number of logic blocks per track. Control circuitry may colloquially be discussed as assigning or mapping sectors to a container, to refer to assigning logic blocks to a container, by way of assigning or mapping logic blocks to a distributed sector, where a container may be one-to-one identical to a distributed sector, or may comprise a plural number of distributed sectors, in various examples.

Beyond a certain point of size, the advantages of mapping data into relatively large distributed sectors may approach an asymptote of diminishing returns, while there may be countervailing advantages to mapping the data into relatively smaller distributed sectors, and there may be additional advantages to making use of distributed sectors of two or more sizes, such as enabling assigning all of the capacity of a single track to an integer number of containers. Beyond a certain point, and depending on various implementation contexts and criteria, the incremental additional advantages of larger distributed sectors may be balanced out by certain advantages of smaller distributed sectors. Above a certain size, relatively smaller distributed sectors may have a relatively higher correction capability. All of these factors may result in a complex set of context-sensitive criteria for how to define the container constitution, how to optimize the mapping of distributed sectors into particular numbers of containers of each of two or more selected sizes, and how to arrange the layout and placement of the distributed sectors into variable containers of different sizes.

By packaging data into standardized variable containers with a standardized range of numbers of logic blocks and/or sectors, that are optimized within the context of disk drive 15 to be within a range of size that balances the advantages of relatively large distributed sectors while retaining the correction capability of distributed sectors that are relatively not too large, control circuitry 22 may optimize among multiple performance criteria for the arrangement of writing and reading data for disk drive 15. By also selecting from among the standardized range of numbers of sectors based on further criteria, control circuitry 22 may further optimize among multiple performance criteria for disk drive 15 responsively to given contexts and criteria, and based at least in part on given context-sensitive criteria and performance goals, including in response to any changes over time.

Sectors-per-track (SPT) may define the number of sectors on a track or set of tracks capable of data storage. For purposes of this disclosure, a set of tracks may be considered to be any set of one or more tracks, and may have any number of available sectors per track, in different examples. In some examples, the applicable track or set of tracks may comprise a set of all available tracks having the same SPT. In some examples, the applicable number of sectors on a track or set of tracks may be or include all sectors available without performing a servo track seek operation. The total sectors (or media sectors) available on a track or set of tracks may include all sectors except for any defective sectors identified during the manufacturing process, where the defective sectors are noted on a list or mapping of the track or of the disk surface, and not used for data storage. Control circuitry 22 implementing a distributed sector track layout (also referred to as a container constitution) may map all media sectors in the SPT to a distributed sector. Control circuitry 22 may define a specific track layout of the distributed sector for the SPT within a Container Span Table (CST) indexed by the SPT. All tracks with the same SPT may have the same distributed sector track layout, in various examples. The CST may define the distributed sector track layouts for all possible SPTs used, in various examples. Control circuitry 22 may assign and/or map data blocks to a track by assigning and/or mapping sectors to containers of two or more different sizes in a variable container assignment scheme, including a relatively larger size, which may be designated C0, and a relatively smaller size, which may be designated C1, with varying numbers of each size of container, in various examples with two size of containers. That is, the containers of size C0 may be relatively larger relative to the size of containers of size C1, and the containers of size C1 may be relatively smaller relative to the size of containers of size C0. In these examples, the number of containers of size C0 may be designated NC0, and the number of containers of size C1 may be designated NC1. Control circuitry may thus use C0, C1, NC0, NC1, and/or other abstract designations or names of the sizes of available containers and the numbers of containers of each size, to gain the advantages of abstracting designations or variable names away from specific numbers used in any particular implementation.

Figure 3:
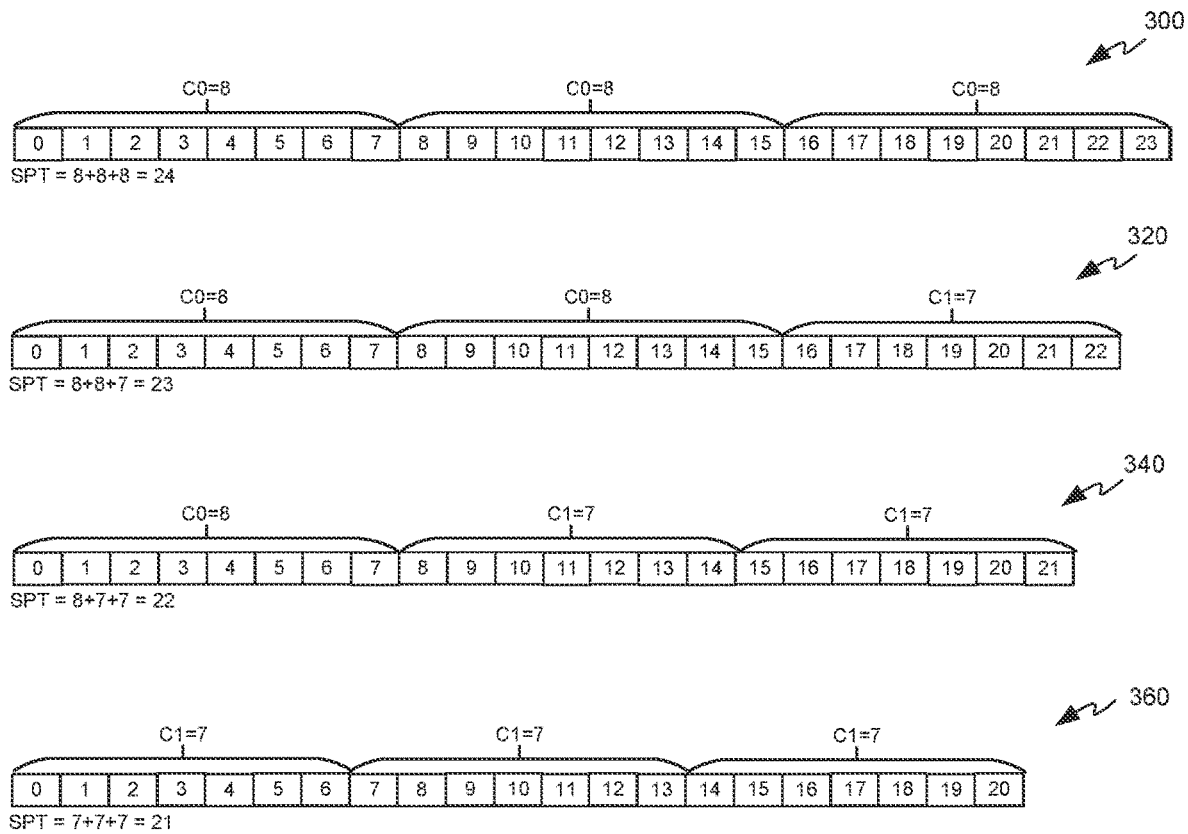
FIG. 3 shows example track sections having various numbers of sectors per track, respectively, and with logic blocks assigned to containers of two different container sizes, in accordance with various examples.

FIG. 3 shows example track sections 300, 320, 340, 360 having 24, 23, 22, and 21 sectors per track, respectively, and with logic blocks assigned to containers of two different container sizes, labeled C0 and C1, of 8 and 7 sectors or logic blocks, respectively, in accordance with a variable container assignment scheme in various examples. For purposes herein, the size of a container may be understood to be in integer numbers of logic blocks or sectors (e.g., distributed sectors) which the container comprises. Table 1 shows the designations of container sizes C0 and C1 and the numbers of containers of each of container sizes C0 and C1, for the examples of each of track sections 300, 320, 340, 360, as shown in FIG. 3.

TABLE 1

| SPT | C0 | NC0 | C1 | NC1 |
|---|---|---|---|---|
| 24 | 8 | 3 | 7 | 0 |
| 23 | 8 | 2 | 7 | 1 |
| 22 | 8 | 1 | 7 | 2 |
| 21 | 8 | 0 | 7 | 3 |

In some examples, the difference or delta in size between C0 and C1 may be a single sector and/or container, as is the case for track sections 300, 320, 340, 360 of FIG. 3, in which the two container sizes are 8 and 7 (designated the C0 and C1 sizes, respectively), which have a delta of 1 between them. In some examples, the delta in size between C0 and C1 may be greater than one logic block or sector. In some examples, a single pair of two sizes of containers, for example, only two sizes designated C0 and C1 are used for the variable container for all possible tracks used, as is the case for track sections 300, 320, 340, 360 of FIG. 3, in which only the two sizes of 7 and 8 are used. In some examples, variable container assignment schemes with multiple combinations of pairs of sizes of containers may be used across the tracks used, for example, some variable container assignment schemes with pairs of sizes of 17 and 16 logic blocks or sectors, and some variable containers with pairs of sizes of 16 and 15 logic blocks or sectors.

Figure 4:
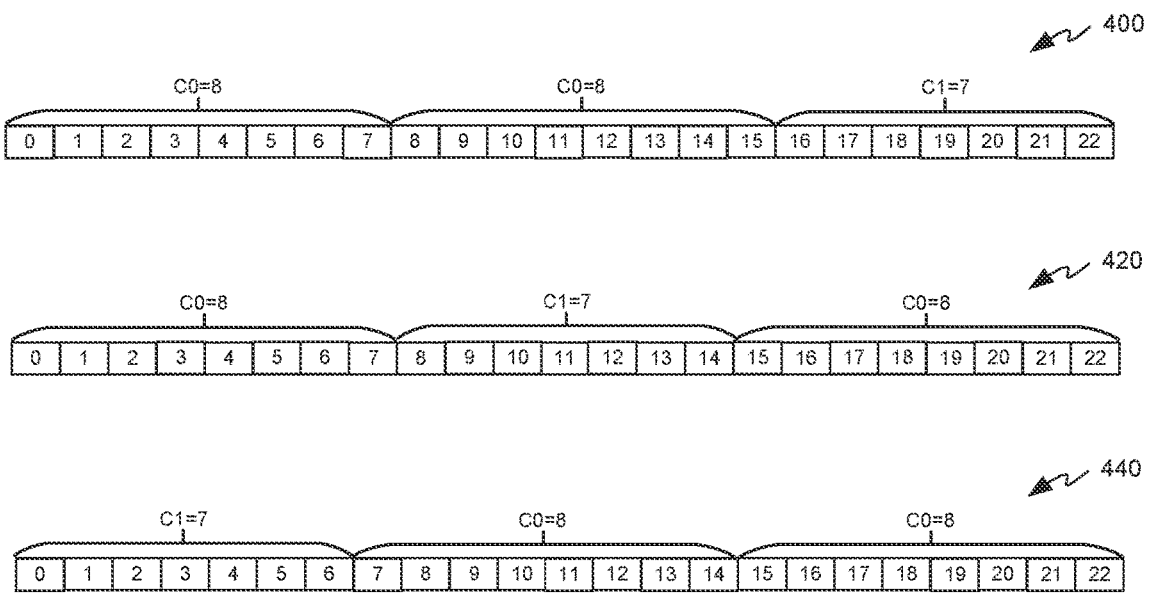
FIG. 4 shows three different container constitutions for track sections with 23 sectors per track section, where each of the container constitutions uses containers of two container sizes, in accordance with various examples.

Control circuitry 22 may specify a container constitution which may define one or more containers having any of a set of sizes and numbers of containers (e.g., C0, NC0, C1, NC1) having any of a number of sectors per track or set of tracks, and/or which sectors to map to which containers, and/or a sequence of the sectors within containers. FIG. 4 shows three different container constitutions 400, 420, 440 for track sections with 23 sectors per track, where each of the container constitutions 400, 420, 440 uses containers of two container sizes, of 8 and 7 logic blocks (designated as the C0 size of 8 and the C1 size of 7, respectively), and where each of the container constitutions 400, 420, 440 has two containers of size 8 and one container of size 7 (where the numbers of containers of each size designated may be designated as NC0=2 and NC1=1, respectively), in various illustrative examples. In particular, container constitution 400 has the C0 sized containers left-justified (i.e., the two containers of size 8 on the left, and the one container of size 7 on the right); container constitution 420 has the different sized containers balanced, with the size 8 containers on the left and right, and the size 7 container in the center; and container constitution 440 has the C0 sized containers right-justified (i.e., the two containers of size 8 on the right, and the one container of size 7 on the left). The container assignments of sectors 7 and 15 may thus change, as to whether they're assigned to the first or second container and the second or third container, respectively, based on which container constitution is assigned by control circuitry 22, while the container assignments of sectors 0 through 6, 8 through 14, and 16 through 22 remain to the first, second, and third containers, respectively, across all three of the options of constitutions 400, 420, 440, in these examples.

A track section, track, or set of tracks with a given number of sectors per track can have multiple containers, or different arrangements of containers with different numbers of each size of container (NC0 and NC1) for a given set of sizes of containers in use (C0 and C1), in various examples. Control circuitry 22 may determine track layout (or constitution), weighting, and justification during design based on the goals of the recording subsystem (RSS) for the specific region of the disk drive media. Control circuitry 22 may apply a single goal to all SPTs in all regions of the media. Once control circuitry 22 determines a constitution, it may assign all SPTs to have that constitution, in some examples. An SPT may support different constitutions in different regions of the disk surface media based on the goal of the RSS specific to each specific region of the different regions of the disk surface media. The constitution for an SPT may then differ from one region of the disk surface media to another, in some examples.

Table 2 shows characterizing assignment information for three different container constitutions with three different arrangements of containers (e.g., containers of different sizes) for a track or set of tracks with 541 sectors per track (SPT), and in which the container sizes designated the C0 and C1 container sizes are 16 and 15 logic blocks, respectively. Control circuitry 22 may assign a set of logic blocks or sectors to a container with any of different sets of weighting of container sizes being used, e.g., with a weighting toward a smaller container size, with a weighting toward a larger container size, or with a balanced weighting that more or less evenly balances the sizes of the containers used, in various examples. In Table 2, the top row shows assignment information for a track weighted towards containers of the smaller size designated C1 (with only 1 C0 size container and 35 C1 size containers); the middle row shows assignment information for a balanced track that is somewhat close to evenly balanced between containers of the larger size designated C0 and the smaller size designated C1 (with 16 C0 sized containers and 19 C1 sized containers); and the bottom row shows assignment information for a track weighted towards containers of the larger size designated C0 (with 31 C0 size containers and only 3 C1 size containers). These three example container constitutions may thus cover the 541 sectors of a track of that size with either 36, 35, or 34 total containers, in these three examples (i.e. for NC0+ NC1 of 1+35, 16+19, 31+3, respectively).

TABLE 2

| SPT | C0 | NC0 | C1 | NC1 | Weighting Note |
|---|---|---|---|---|---|
| 541 | 16 | 1 | 15 | 35 | Weighted towards C1 |
| 541 | 16 | 16 | 15 | 19 | Balanced between C0 and C1 |
| 541 | 16 | 31 | 15 | 3 | Weighted toward C0 |

Thus, in the example of the container constitution indicated in the first row of Table 2, control circuitry 22 may weight the containers assigned to the track towards containers of size C1. In the example of the container constitution indicated in the second row of Table 2, control circuitry 22 may weight the containers assigned to the track to a relative balance among containers of size C0 and containers of size C1. In the example of the container constitution indicated in the third row of Table 2, control circuitry 22 may weight the containers assigned to the track towards containers of size C0.

Control circuitry 22 may determine and assign containers and container constitutions based at least in part on fitting integer numbers of sectors and containers to one or more tracks, or track sections or sets of one of more tracks, in various examples, such as those indicated in Table 2. In other examples, control circuitry 22 may determine and assign containers and container constitutions without regard to being bound by whether integer numbers of sectors and containers are to be fit to one or more track sections or tracks or sets of one of more tracks, in various examples in which logic blocks and/or distributed sectors may be combined with an example technique known as elastic track, which may support a distributed sector spanning across one or more servo track seeks, or in example implementations in which one or more sectors of a track or set of tracks may be left as orphans after integer numbers of containers of each designated size are assigned.

Control circuitry 22 may define and assign a container constitution and variable containers (e.g., containers of two or more sizes) to one or more sets of one of more tracks, having a given number of sectors per track, via runtime code, in various examples, as with an example technique known as L-sector. Control circuitry 22 may define and assign a container constitution and variable containers to one or more sets of one of more tracks, having a given number of sectors per track, via a table, such as a lookup table, in various examples. When control circuitry 22 defines and/or assigns a container constitution and/or variable containers in a table or in a runtime, for one or more sets of one of more tracks having a given number of sectors per track, control circuitry 22 may define the table or the runtime to have any value of sectors per track (SPT) in a range between 0 to the maximum possible SPT, in various examples. Control circuitry 22 may also define a table or a runtime only to use the SPTs used in a set or pre-defined system of disk drive 15, in various examples. Control circuitry 22 may use the number of available SPTs as part of its criteria for defining the variable container and the container constitution in the table, in various examples.

The container payload may define a type and amount of data stored within a container. As examples of different payloads with different types of data, control circuitry 22 may encode or generate a container's payload to include only user data, only parity data, or both user data and parity data, in various examples. Containers of the same size may or may not have the same payload. FIG. 5 shows five different containers 500, 520, 540, 560, 580, of three different container sizes, each container having a different payload, each with a size and/or mix of data types between user data and parity data, unique from the payload of any of the others, in accordance with various examples. In particular, container 500 has a payload of size 15 logic blocks of entirely user data; container 520 has a payload of size 16 logic blocks of entirely user data; container 540 has a payload of size 16 logic blocks, of which 12 are user data and 4 are parity data; container 560 has a payload of size 17 logic blocks of entirely user data; and container 580 has a payload of size 17 logic blocks, of which 13 are user data and 4 are parity data. In examples in which each logic block has 4 KB of data, therefore, container 500 has a payload that includes 60 KB of user data; container 520 has a payload that includes 64 KB of user data; container 540 has a payload that includes 48 KB of user data and 16 KB of parity data; container 560 has a payload that includes 68 KB of user data; and container 580 has a payload that includes 52 KB of user data and 16 KB of parity data. In other examples, containers of this disclosure may include any other payloads, including any other total sizes and any other sets of sizes of data devoted to each of any type of data, which may include other data types in addition to or instead of user data and parity data, and in sizes measured in any increments of any size, besides the specific example of size increments of logic blocks of 4 KB of data each as in the examples above.

Figure 6:
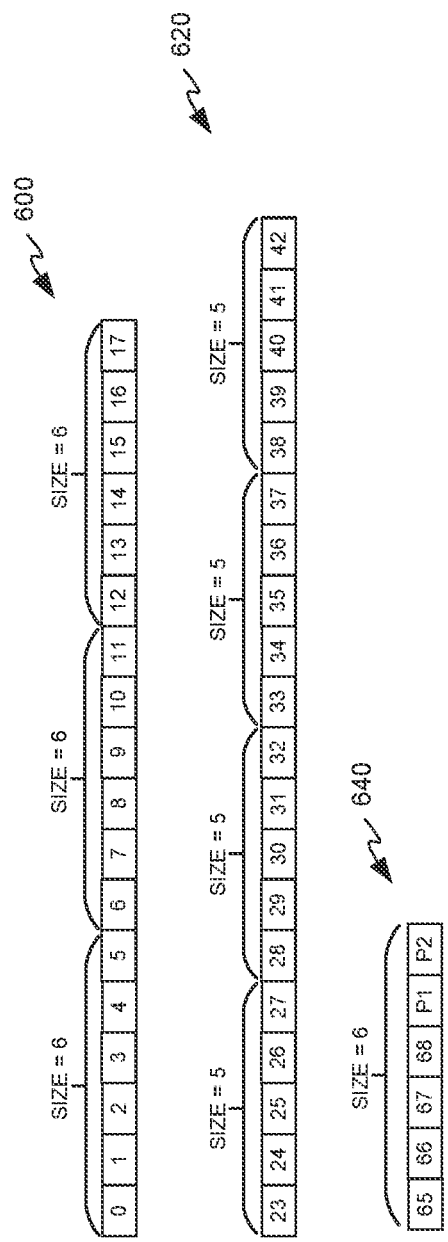
FIG. 6 shows three different spans of containers, in which each span of containers is unique in its combination of container size and payload, in accordance with various examples.
Figure 7:
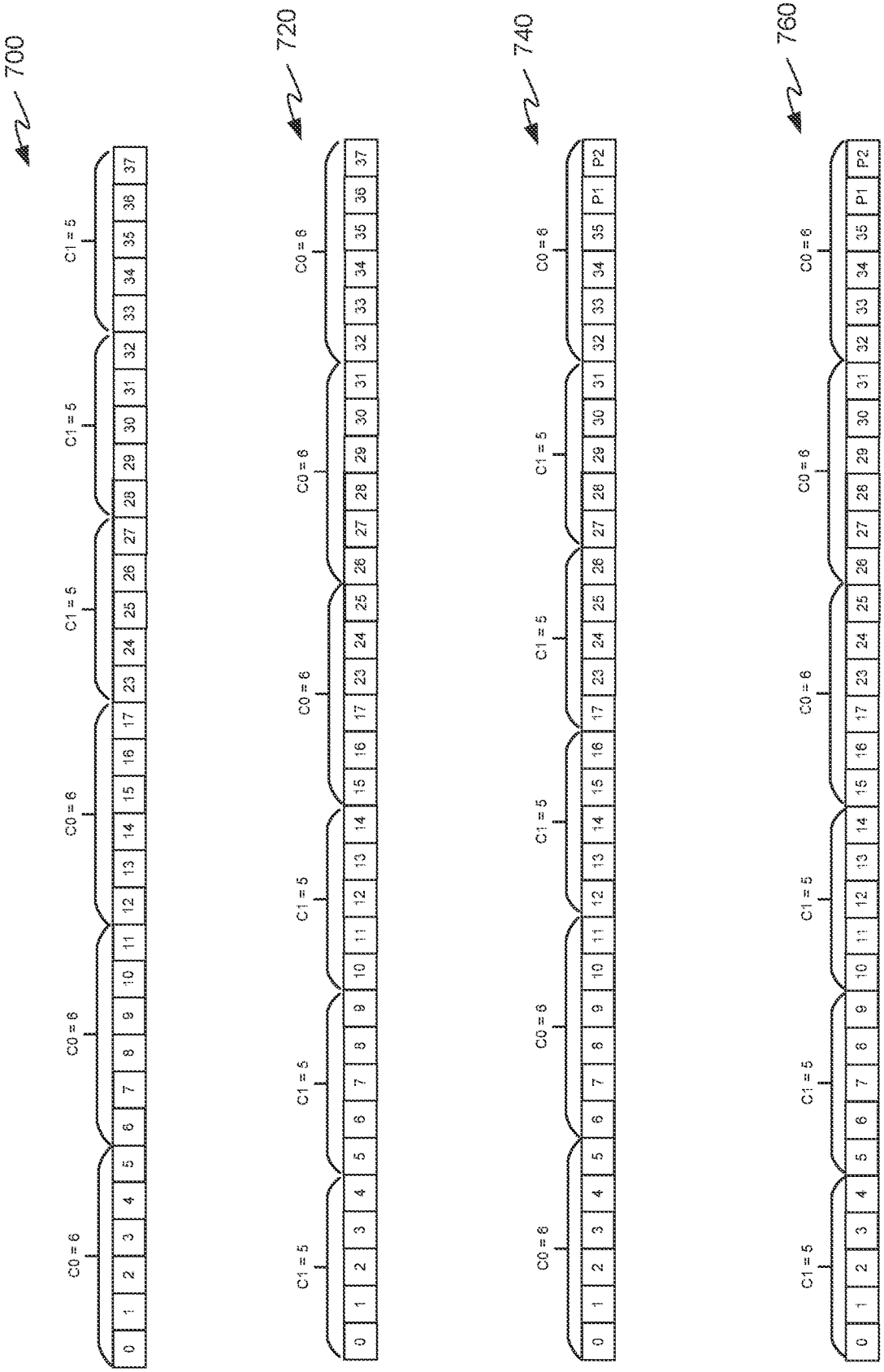
FIG. 7 shows four container span sets in which each container span set is unique in its combination of spans of containers, in accordance with various examples.

FIG. 6 introduces the concepts of spans of containers, and FIG. 7 introduces the concept of container span sets, where a container span set is defined to include one or more spans of containers. A span of containers may be defined as a set of one or more sequentially stored containers in which all containers in the span of containers have the same payload, i.e., to have the same total size of data, and the same size of data assigned to each data type, such as user data and parity data. Control circuitry 22 may output write instructions for spans of containers. A container span set may be defined to include one or more spans of containers in which each span of containers is internally unique in its container size and payload.

FIG. 6 shows three different spans of containers 600, 620, 640, in which each span of containers is unique in its combination of container size and payload, in accordance with various examples. Span of containers 600 includes three containers in sequence, where each container is six logic blocks in size, and has a payload of all user data. Span of containers 620 includes four containers in sequence, where each container is five logic blocks in size, and has a payload of all user data. Span of containers 640 includes one single container, where the container is six logic blocks in size, and has a payload of four logic blocks of user data and two logic blocks of parity data. In other examples, spans of containers may include any other number of containers, where the containers may be of any number of logic blocks and/or any size, and include any payload, such as all user data, all parity data, any other type of data, or any combination of user data, parity data, and/or any other types of data.

FIG. 7 shows four container span sets 700, 720, 740, 760, in which each container span set is unique in its combination of spans of containers, in accordance with various examples. FIG. 7 shows a container span set 700 that includes two spans of containers. Each of the two spans of containers in container span set 700 includes three containers. Each of the three containers in the span of containers on the left is of size six logic blocks, which may here be referred to as size C0, and each of the three containers in the span of containers on the right is of size five sectors, which may here be referred to as size C1. Control circuitry 22 may thus define the spans of containers within container span set 700 to be C0 left-justified and C1 right-justified, or to have the containers of size C0 be left-justified within container span set 700 and the containers of size C1 be right-justified within container span set 700, in this example.

FIG. 7 also shows a container span set 720, similar to container span set 700 in having three containers of size C0 and three containers of size C1, but in which control circuitry 22 may define the span of containers within container span set 720 to be C0 right-justified and C1 left-justified, in this example. In other words, control circuitry 22 may assign all three containers of size C1 to be left-justified within container span set 720, and all three containers of size C0 to be right-justified within container span set 720.

FIG. 7 also shows an example container span set 740, similar to container span sets 700 and 720 in having three containers of size C0 and three containers of size C1, and in which one container of size C0 includes a combination of both user data and parity data, while the other five containers all include purely user data. In this example, control circuitry 22 may define the span of containers within container span set 740 with regard both to sizes of the containers, and the payloads of the containers, that is, whether the containers include only user data payload or also include a payload of some sectors of parity data, in order to justify the parity data or otherwise configure the arrangement of parity data with reference to container span set 740 as a whole. In particular, control circuitry 22 may right-justify the parity data payload sectors across container span set 740 as a whole, and left-justify the user data payload sectors across container span set 740 as a whole. Subject to those criteria, control circuitry 22 may then assign the containers that include only user data in accordance with another criterion, such as left-justifying and right-justifying based on container size. In particular, control circuitry 22 left-justifies the containers that include only user data and are of size C0, of six logic blocks each, and right-justifies the containers that include only user data and are of size C1, of five logic blocks each, within the region of container span set 740 that remains after first right-justifying the container that includes the parity data logic blocks, which are themselves right-justified within the container, and thereby right-justified relative to the entirety of container span set 740.

FIG. 7 also shows an example container span set 760, similar to container span sets 700, 720, and 740 in having three containers of size C0 and three containers of size C1, and similar to container span set 740 in having one container with a mixed payload of both some user data logic blocks and some parity data logic blocks, as well as similar to container span set 720 in left-justifying the containers of size C1 and right-justifying the containers of size C0. Additionally, in the example of container span set 760, the mixed-payload container is one of the containers of size C0, which are right-justified, so control circuitry 22 can assign the layout of the containers within container span set 760 to right-justify the parity data across the entirety of container span set 760 while also having consistent size-based justification of containers across the entirety of container span set 760.

Control circuitry 22 may thus define and/or assign container span sets to combine aligning with parity ranges and to arrange left and right justifications based on container sizes, in various examples, as shown in the examples of container span sets 740 and 760 of FIG. 7, or not to align with a parity range or not to have an applicable parity range to align with, as is shown in the examples of container span sets 700 and 720 of FIG. 7.

Figure 8:
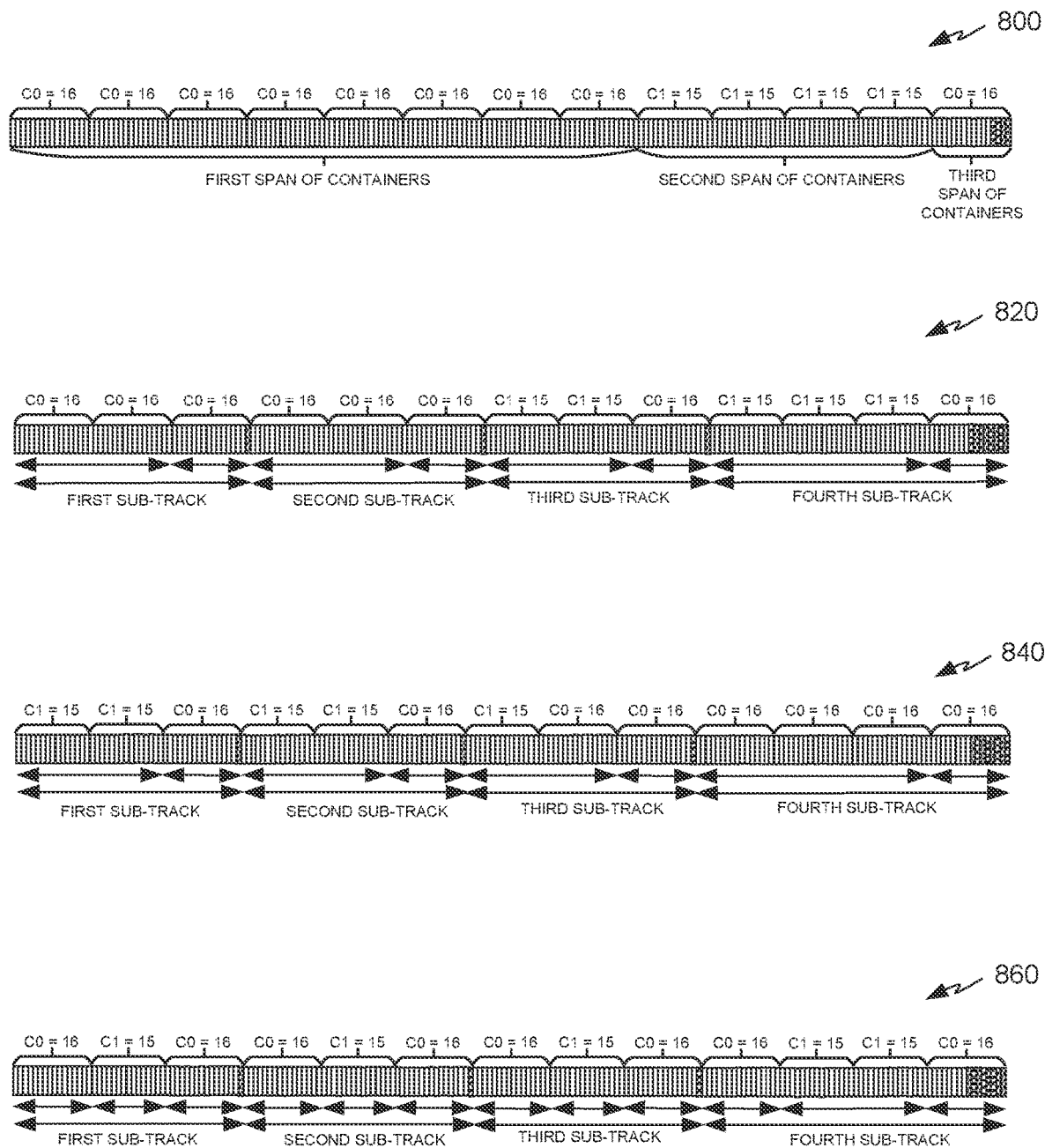
FIG. 8 shows four different tracks with assigned containers which control circuitry may encode for writing data, and in which each track comprise spans of containers and a combination of user data and parity data, in accordance with various examples.

FIG. 8 shows four different tracks 800, 820, 840, and 860, with assigned containers which control circuitry 22 may encode for writing data in a variable container assignment scheme, and in which each track comprise spans of containers and a combination of user data and parity data, in accordance with various examples. FIG. 8 introduces sub-tracks. A sub-track may be defined as a portion of a track, having some parity data and forming a parity range, and that includes one or more container span sets. Control circuitry 22 may define a container constitution to assign spans of containers to be included within one or more container span sets, the container span sets to be included within one or more sub-tracks, and sub-tracks to be included within a track, or one or more tracks or sets of tracks, in various examples. In FIG. 8, variable container 800 comprises container span sets with three spans of containers in a single sub-track with a variable container weighted towards the C0 container size, and in which the C0 container size user data containers are left-justified on the track, in accordance with an illustrative example.

Control circuitry 22 may thus define a container constitution to have only one container span set sub-track, in various examples, as shown in the examples of container span sets 700, 720, 740, and 760 of FIG. 7, as well as track 800 of FIG. 8. Control circuitry 22 may define the container constitution to have multiple container span sets dividing a track into sub-tracks, in various examples, as shown in the examples of tracks 820, 840, and 860 shown in FIG. 8, described below.

FIG. 8 also shows track 820 which comprises multiple container span sets, in which each container span set is in a sub-track of its own with its own sub-track level parity data, with the overall track 820 fairly balanced between containers of sizes C0 and C1, and with the overall track 820 first arranging the sub-tracks for parity data to be right-justified within each sub-track, and then left-justifying the C0 sized containers across the overall track 820, subject to the right-justified parity data within the sub-tracks, rendering overall track 820 with C0 size containers left-justified across the first two sub-tracks. Track 820 thus has each individual sub-track containing its user payload left-justified and with individual sub-track parity data right-justified within each sub-track, as well as parity data for the overall track 820 right-justified relative to the entire track 820, with the right-most sub-track comprising right-justified parity data for both the sub-track and the entire track 820, in accordance with an illustrative example.

FIG. 8 also shows track 840 which comprises multiple container span sets, each in a sub-track with the overall track 840 fairly balanced among containers of the C0 and C1 container sizes, and with each individual sub-track containing its user payload left-justified and its individual sub-track parity data right-justified within each sub-track. Track 840 also has parity data for the overall track right-justified relative to the track, in accordance with an illustrative example. In this example, parity data is only included in C0 sized containers. The overall track 840 is thus first arranged with the sub-tracks for parity data to be right-justified within each sub-track, and then left-justifying the C1 sized containers and right-justifying the C0 sized containers across the overall track 860, subject to the right-justified parity data within the sub-tracks. In this example, the only exceptions to left-justifying the C1 sized containers and right-justifying the C0 sized containers across overall track 860 are thus to include one right-justified C0 sized container within each sub-track, and which comprises right-justified parity data internally to the container, which serves as right-justified parity data relative to each sub-track. The right-most container of the right-most sub-track also includes right-justified parity data for the entirety of track 840.

FIG. 8 also shows track 860 which comprises multiple container span sets, each in a sub-track, with the overall track 860 having a weighting that is somewhat weighted toward more C0 sized containers and somewhat balanced weighting across containers of the C0 and C1 container sizes, and the container span sets and sub-tracks somewhat balancing containers of mostly user data of the C0 and C1 container sizes across the track, in accordance with an illustrative example. Track 860 also includes some individual sub-track parity data right-justified within each sub-track, as well as parity data for the overall track right-justified relative to the entire track 860, in accordance with this illustrative example. In this example, the parity data is only included in C0 sized containers, and right-justified within each such container, and each sub-track is arranged with a right-justified C0 sized container containing the parity data for the sub-track, and then otherwise with C0 sized containers left-justified within each sub-track and C1 sized containers right-justified within each sub-track. Track 860 thus has a weighting that is almost evenly balanced between C0 and C1 sized containers, other than for the containers that comprise parity data.

Thus, in various examples, control circuitry 22 may left-justify C0 sized data payload containers across a track or set of tracks, other than as subject to parity right-justification per sub-track and per track, in some examples, as is shown with track 820. In other examples, control circuitry 22 may encode container span sets to left-justify C1 sized data payload containers across a track or set of tracks, other than as subject to parity data right-justification per sub-track and per track, as is shown with track 840. In other examples, control circuitry 22 may encode the container span sets to balance C0 and C1 sized data payload containers across the track, other than for the containers that comprise parity data, as is shown with track 860. In each of these particular examples, control circuitry 22 may encode container span sets with user data left-justified within each sub-track and within the overall track, and with parity data right-justified within each sub-track and within the overall track. In other examples, control circuitry 22 may encode tracks or container span sets to have any other combination of sizes of containers, any other weighting of container sizes across sub-tracks and across the track as a whole, and any other justification or distribution of user data and parity data.

Thus, in various examples, control circuitry 22 may map, assign, and/or encode tracks with any of a variety of containers and with any of a variety of arrangements of user data, parity data, and/or other types of data, in containers of various sizes of logic blocks, and arranged in any of various container spans, container span sets, sub-tracks, and/or tracks or sets of tracks. In various examples, any of such arrangements may provide novel advantages such as enabling efficient writing, reading, and processing of large blocks of data while capturing and promoting various advantages of interleaving and arranging data, in ways that may optimize or balance among various competing design constraints, as described herein.

In some examples in which the container span set aligns with a parity range, control circuitry 22 may encode parity sectors to be included in the payload of the container span set, as is shown in container span sets 740 and 760 of FIG. 7 and tracks 800, 820, 840, and 860 of FIG. 8. In other examples in which the container span set aligns with a parity range, control circuitry 22 may encode parity sectors to be stored external to the container span sets and not included in the payload of the container span sets. In some examples, control circuitry 22 may encode a container span set to align with a parity range, and store parity information for the container span set right-justified within the container span set, and/or store parity information for the container right-justified within a container, in various examples.

Control circuitry 22 may use any of various techniques for determining the sizes of sub-tracks, in various examples. Control circuitry 22 may determine the size of a sub-track by balancing the number of containers for all sub-tracks, in various examples. Control circuitry 22 may also determine the size of a sub-track by balancing the number of logic blocks in each sub-track, and then determining a container constitution that may best represent that balance, in various examples. Various examples of this disclosure may thus include any form or combination of justifying and/or weighting containers and/or payloads within one or more track sections, within one or more sub-tracks, across sub-tracks, across an entire track or set of tracks, or across the entire disk drive 15, in various examples. Various examples of this disclosure may thus include parity data at the ends of a series of spans or container span sets, and/or use inner parity, with parity data included at the ends of spans and/or sub-tracks. Other examples may include control circuitry 22 assigning any placement, layout, and arrangement of parity data relative to other data such as user data. Control circuitry 22 may assign justification of different sizes, payloads, or other types of logic blocks, containers, or container spans to be left-justified, right-justified, or in a fairly balanced or spread-out arrangement across a track or set of tracks or across a sub-track, in various examples. Control circuitry 22 may assign logic blocks in accordance with any possible combination, layout, positioning, justification, and arrangement of logic blocks, containers, and all other sets of data of all kinds as described herein, in various examples.

Control circuitry 22 may also use balancing of the sizes of sub-tracks as a criterion in assigning logic blocks into containers of different sizes and sub-tracks. Control circuitry 22 may use, as criteria for assigning logic blocks into containers of different sizes and sub-tracks, given a set of two or more designated sizes of containers, determining all possible combinations of logic blocks into containers of those sizes that will enable constituting a track, or track section or set of tracks, where the more sectors per track (SPT) there are, the more potential combinations of containers of applicable or designated sizes may be possible. Control circuitry 22 may also use, as criteria, whether, in a given context or application, there may be greater advantage in weighting toward a higher number of relatively larger size containers, weighting toward a higher number of relatively smaller size containers, or distributing across a balanced set of containers of different sizes. Control circuitry 22 may also use, as criteria, whether, in a given context or application, there may be greater advantage in left-justifying relatively larger size containers or left-justifying relatively smaller size containers, prior to selecting numbers of larger size containers and smaller size containers to assign.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry may comprises logic circuitry, such as state machine circuitry. In some examples, at least some of the flow diagram blocks may be implemented using analog circuitry (e.g., analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations fall within the scope of this disclosure. Certain method, event or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 and other methods of this disclosure may be performed by or embodied in hardware, and/or performed or executed by a controller, a CPU, an FPGA, a SoC, a measurement and control multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:
1. A data storage device, comprising:
one or more disks;
a write mechanism configured to write data to disk surfaces of the one or more disks, the write mechanism comprising an actuator arm assembly that includes heads suspended over the disk surfaces; and one or more processing devices, individually or in combination, configured to:
encode data into a plurality of logic blocks;
assign at least some of the logic blocks to a plurality of containers of two or more different container sizes, wherein the containers each comprise one or more distributed sectors; and
output a write signal to the write mechanism to write the at least some of the logic blocks in an interleaved pattern on the disk surfaces in accordance with the assigning of the at least some of the logic blocks to the plurality of containers.

2. The data storage device of claim 1, wherein the assigning of the at least some of the logic blocks to the plurality of containers is based at least in part on criteria that comprise:
one or more advantages of a relatively larger container size; and
one or more advantages of a relatively smaller container size.

3. The data storage device of claim 2, wherein the one or more advantages of the relatively larger container size, relative to the relatively smaller container size, comprise at least one of:
relatively higher averaging of variation in track misregistration (TMR);
relatively higher averaging of signal-to-noise ratio (SNR);
relatively higher diluting of impact of defects in the disk surfaces across the logic blocks;
relatively higher density of data tracks per width;
distributing distributed sectors across a relatively larger number of the logic blocks; and
distributing distributed sectors across a relatively larger number of data tracks,
and wherein the one or more advantages of the relatively smaller container size, relative to the relatively larger container size, comprises at least relatively higher correction capability.

4. The data storage device of claim 1, wherein the assigning of the at least some of the logic blocks to the plurality of containers is based at least in part on criteria that comprise:
weighting the containers toward a relatively larger container size.

5. The data storage device of claim 1, wherein the assigning of the at least some of the logic blocks to the plurality of containers is based at least in part on criteria that comprise:
weighting the containers toward a relatively smaller container size.

6. The data storage device of claim 1, wherein the assigning of the at least some of the logic blocks to the plurality of containers is based at least in part on criteria that comprise:
balancing the containers between a relatively larger container size and a relatively smaller container size.

7. The data storage device of claim 1, wherein the assigning of the at least some of the logic blocks to the plurality of containers is based at least in part on criteria that comprise:
fitting an integer number of the containers to an available track on the disk surfaces.

8. The data storage device of claim 1, wherein the assigning of the at least some of the logic blocks to the plurality of containers is based at least in part on criteria that comprise:
left-justifying, on a track, containers of relatively larger container size.

9. The data storage device of claim 1, wherein the assigning of the at least some of the logic blocks to the plurality of containers is based at least in part on criteria that comprise:
left-justifying, on a track, containers of relatively smaller container size.

10. The data storage device of claim 1, wherein the assigning of the at least some of the logic blocks to the plurality of containers is based at least in part on criteria that comprise:
balancing a distribution of containers of a relatively larger container size and of a relatively smaller container size within the plurality of containers.

11. The data storage device of claim 1, wherein at least one of the containers further comprises parity data, and wherein the assigning of the at least some of the logic blocks to the plurality of containers is based at least in part on criteria that comprise:
right-justifying, on a track, the container that comprises the parity data.

12. The data storage device of claim 1, wherein the assigning of the at least some of the logic blocks to the plurality of containers further comprises:
assigning, by the one or more processing devices, individually or in combination, one or more of the logic blocks to a container span that comprises a plurality of the containers, wherein each of the containers comprised in the container span is of a same size as the others of the containers comprised in the container span.

13. The data storage device of claim 1, wherein the assigning of the at least some of the logic blocks to the plurality of containers further comprises:
assigning, by the one or more processing devices, individually or in combination, the logic blocks to two or more sub-tracks within the plurality of containers.

14. The data storage device of claim 1, wherein the plurality of containers contains all of the logic blocks from the encoding the data into the plurality of logic blocks, in a one-to-one relationship between the containers and the distributed sectors in accordance with a distributed sector encoding scheme.

15. The data storage device of claim 1, wherein the distributed sectors are mapped to physically dispersed, distributed areas on the disk surfaces.

16. A method comprising:
encoding, by one or more processing devices, individually or in combination,
assigning, by the one or more processing devices, individually or in combination, at least some of the logic blocks to a plurality of containers of two or more different container sizes, wherein the containers each comprise one or more distributed sectors; and
outputting, by the one or more processing devices, individually or in combination, a write signal to write the at least some of the logic blocks in an interleaved pattern on one or more disk surfaces of one or more disks of a data storage device in accordance with the assigning of the at least some of the logic blocks to the plurality of containers.

17. The method of claim 16, wherein the assigning of the at least some of the logic blocks to the plurality of containers is based at least in part on criteria that comprise:
one or more advantages of a relatively larger container size; and one or more advantages of a relatively smaller container size, wherein the one or more advantages of the relatively larger container size, relative to the relatively smaller container size, comprise at least one of:

relatively higher averaging of variation in track misregistration (TMR);

relatively higher averaging of signal-to-noise ratio (SNR);

relatively higher diluting of impact of defects in the disk surfaces across the logic blocks;

relatively higher density of data tracks per width;

distributing distributed sectors across a relatively larger number of the logic blocks; and distributing distributed sectors across a relatively larger number of data tracks, and wherein the one or more advantages of the relatively smaller container size, relative to the relatively larger container size, comprises at least relatively higher correction capability.

18. One or more processing devices, individually or in combination, comprising:

means for encoding data into a plurality of logic blocks;

means for assigning at least some of the logic blocks to a plurality of containers of two or more different container sizes, wherein the containers each comprise one or more distributed sectors; and means for outputting a write signal to a write mechanism configured to write data to disk surfaces of one or more disks of a data storage device, to write the at least some of the logic blocks in an interleaved pattern on the disk surfaces in accordance with the assigning of the at least some of the logic blocks of data to the plurality of containers.

19. The one or more processing devices of claim 18, wherein the assigning of the at least some of the logic blocks to the plurality of containers is based at least in part on criteria that comprise:

one or more advantages of the relatively larger container size; and one or more advantages of the relatively smaller container size, wherein the one or more advantages of the relatively larger container size, relative to the relatively smaller container size, comprise at least one of:

relatively higher averaging of variation in track misregistration (TMR);

relatively higher averaging of signal-to-noise ratio (SNR);

relatively higher diluting of impact of defects in the disk surfaces across the logic blocks;

relatively higher density of data tracks per width;

distributing distributed sectors across a relatively larger number of the logic blocks; and distributing distributed sectors across a relatively larger number of data tracks, and wherein the one or more advantages of the relatively smaller container size, relative to the relatively larger container size, comprise at least relatively higher correction capability.

* * * * *